United States Patent
Kim et al.

(10) Patent No.: US 9,124,172 B2
(45) Date of Patent: Sep. 1, 2015

(54) DIGITAL BUCK-BOOST CONVERSION CIRCUIT AND METHOD OF OPERATING THE SAME

(75) Inventors: Je Kook Kim, Yongin-si (KR); Sang-Yong Park, Suwon-si (KR); Chan-Woo Park, Anyang-si (KR); Young Hoon Lee, Seoul (KR); Byung Chul Jeon, Seongnam-si (KR); Min Shik Seok, Paju-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 374 days.

(21) Appl. No.: 13/609,376

(22) Filed: Sep. 11, 2012

(65) Prior Publication Data

US 2013/0169244 A1 Jul. 4, 2013

(30) Foreign Application Priority Data

Dec. 29, 2011 (KR) .................. 10-2011-0145420

(51) Int. Cl.
*H02M 3/157* (2006.01)
*H02M 1/15* (2006.01)
*H02M 1/44* (2007.01)
*H02M 1/00* (2007.01)
*H02M 3/158* (2006.01)

(52) U.S. Cl.
CPC ....... *H02M 1/15* (2013.01); *H02M 1/44* (2013.01); *H02M 3/157* (2013.01); *H02M 3/1582* (2013.01); *H02M 2001/0012* (2013.01)

(58) Field of Classification Search
CPC .............. H02M 3/1582; H02M 3/157; H02M 3/33515; H02M 2001/0012
USPC ................... 323/283, 271, 259, 225
See application file for complete search history.

(56) References Cited

U.S. PATENT DOCUMENTS

| 7,656,136 | B2 | 2/2010 | Chang |
| 7,743,266 | B2 * | 6/2010 | Chapuis ........................ 713/300 |
| 2010/0301825 | A1 | 12/2010 | Yamaguchi et al. |

FOREIGN PATENT DOCUMENTS

JP 2011097778 A 5/2011

\* cited by examiner

*Primary Examiner* — Harry Behm
(74) *Attorney, Agent, or Firm* — Harness, Dickey & Pierce, P.L.C.

(57) ABSTRACT

A digital buck-boost conversion circuit includes an analog-to-digital converter configured to convert an output voltage signal into a digital signal, a pulse period control block configured to output a pulse period control signal based on degrees of scattering at different frequencies of the digital signal, a pulse generation block configured to output a pulse based on the pulse period control signal, and a buck-boost converter configured to convert the pulse into the output voltage signal.

17 Claims, 6 Drawing Sheets

DIGITAL BUCK-BOOST CONVERSION CIRCUIT AND METHOD OF OPERATING THE SAME

CROSS-REFERENCE TO RELATED APPLICATIONS

This application claims priority under 35 U.S.C. §119 to Korean Patent Application No. 10-2011-0145420 filed on Dec. 29, 2011 in the Korean Intellectual Property Office (KIPO), the entire contents of which are incorporated herein by reference.

BACKGROUND

Example embodiments relate to a buck-boost conversion circuit, and more particularly, to a digital buck-boost conversion circuit for performing buck-boost conversion based on a digital control signal and a method of operating the same.

Recently, all electronic products are supplied with a constant voltage as an operating voltage. These electronic products include a voltage controller that supplies the constant voltage. A buck-boost converter is used as the voltage controller.

The buck-boost converter is a type of DC-to-DC converter that outputs a voltage neither higher nor lower than a reference voltage. The buck-boost converter functions as a boost converter that boosts an input voltage when the input voltage is lower than the reference voltage and functions as a buck converter that drops the input voltage when the input voltage is higher than the reference voltage.

Conventional buck-boost conversion circuits include a control circuit, which compare an output voltage of the buck-boost converter with the reference voltage and performs pulse width modulation (PWM) on a comparison result using a sawtooth signal to control the buck-boost converter.

Since conventional buck-boost conversion circuits operate in an analog mode, occupy a large area in a chip, and have low efficiency because they consume a large amount of current. Conventional buck-boost conversion circuits may cause electromagnetic interference (EMI), and a ripple component may occur in an output voltage of the conventional buck-boost conversion circuits.

Conventional buck-boost conversion circuits may be improved in terms of the area and current consumption, but research and development for removing EMI and ripple component is required. Accordingly, to remove EMI and ripple component, conventional buck-boost conversion circuits use a method of increasing or decreasing the frequency of PWM signal or a method of adding a noise component to a PWM signal. However, conventional buck-boost conversion circuits still cause high EMI and have a ripple component in their output voltages.

SUMMARY

According to at least some example embodiments, there is provided a digital buck-boost conversion circuit comprising an analog-to-digital converter configured to convert an output voltage signal into a digital signal, a pulse period control block configured to output a pulse period control signal based on degrees of scattering at different frequencies of the digital signal, a pulse generation block configured to output a pulse based on the pulse period control signal, and a buck-boost converter configured to convert the pulse into the output voltage signal.

The pulse period control block may include a first sensing circuit configured to measure voltage levels of the digital signal at each of the different frequencies and store the measured values in a memory, a calculation circuit configured to calculate the degrees of scattering at the different frequencies with the measured values stored in the memory, and a first control circuit configured to generate the pulse period control signal for controlling a period of the pulse based on the degrees of scattering.

The first sensing circuit may include a band pass filter configured to decompose the digital signal to the each of the different frequencies; and a level detector configured to add an output of the band pass filter and the digital signal, measure a signal resulting from the addition, and store a measurement result as the measured values in the memory.

The first control circuit may include a code generation circuit configured to output a clock code for the period of the pulse based on the degrees of scattering and a digitally controlled oscillator configured to generate the pulse period control signal based on the clock code.

The digital buck-boost conversion circuit may further include a pulse duty cycle control block configured to generate a pulse duty cycle control signal for controlling a duty cycle of the pulse based on a level of the digital signal.

The pulse duty cycle control block may include a second sensing circuit configured to measure the level of the digital signal; a ripple removing circuit configured to remove a ripple component from the measured level; a subtraction circuit configured to output a difference between an output of the ripple removing circuit and a reference voltage; and a second control circuit configured to output the pulse duty cycle control signal having a current pulse duty cycle value, which is determined according to an output of the subtraction circuit and a previous pulse duty cycle value.

The pulse duty cycle value may be defined as $Y_n = A \cdot Y_{n-1} + B \cdot X$, where X is the output of the subtraction circuit, $Y_{n-1}$ is the previous pulse duty cycle value, A is a gain with respect to $Y_{n-1}$, and B is a gain with respect to X.

The digital buck-boost conversion circuit may further include a driving current buffer configured to output a driving current to the buck-boost converter based on the pulse. The pulse period control block may output a driving current control signal for controlling a magnitude of the driving current.

The digital buck-boost conversion circuit may be implemented as a part of a mobile device.

According to at least some other example embodiments, there is provided a digital buck-boost conversion method comprising converting an output voltage signal into a digital signal, generating a pulse period control signal based on degrees of scattering at different frequencies of the digital signal, generating a pulse whose period has been controlled based on the pulse period control signal, and converting the pulse into the output voltage signal.

The generating the pulse period control signal may include measuring voltage levels of the digital signal at each of the different frequencies and storing the measured values in a memory; calculating the degrees of scattering at the each of the different frequencies with the measured values stored in the memory; and generating the pulse period control signal based on the degrees of scattering.

The generating the pulse period control signal may include generating a clock code for controlling the period of the pulse based on the degrees of scattering and generating the pulse period control signal based on the clock code.

The method may further include generating a pulse duty cycle control signal for controlling a duty cycle of the pulse based on a level of the digital signal.

The generating the pulse duty cycle control signal may include measuring the level of the digital signal; removing a ripple component from the measured level; and generating the pulse duty cycle control signal having a current pulse duty cycle value, which is determined according to a difference between a result of removing the ripple component and a reference voltage and according to a previous pulse duty cycle value.

The pulse duty cycle value may be defined as $Y_b = A \cdot Y_{n-1} + B \cdot X$, where X is the difference between the result of removing the ripple component and the reference voltage, is the previous pulse duty cycle value, A is a gain with respect to $Y_{n-1}$, and B is a gain with respect to X.

According to at least one example embodiment, a conversion circuit may include an analog-to-digital converter configured to convert an output voltage signal into a digital signal; a buck-boost converter configured to generate the output voltage based on a pulse period control signal; and a pulse period control block configured to determine one or more excessive frequencies, and generate the pulse period control signal such that the output voltage signal generated by the buck-boost converter does not include a frequency component corresponding to one of the one or more excessive frequencies.

The pulse period control block may be configured to identify degrees of scattering at different frequencies of the digital signal, and determine the one or more excessive frequencies from among the different frequencies of the digital signal based on the degrees of scattering.

The one or more excessive frequencies may be frequencies determined by the pulse period control block to be associated with degrees of scattering above a reference degree.

For each of a plurality of different frequencies of the digital signal, the pulse period control block may be configured to measure a plurality of voltage levels of the digital signal at the frequency, and to determine a scattering value associated with the frequency based on at least one of a variance and a standard deviation of the measured plurality of voltage levels, and the one or more excessive frequencies may be frequencies having scattering values above a reference value, from among the plurality of different frequencies.

According to at least one example embodiment, the conversion circuit may further include a pulse generation block configured to output a pulse based on the pulse period control signal, the buck-boost converter being configured to convert the pulse into the output voltage signal.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
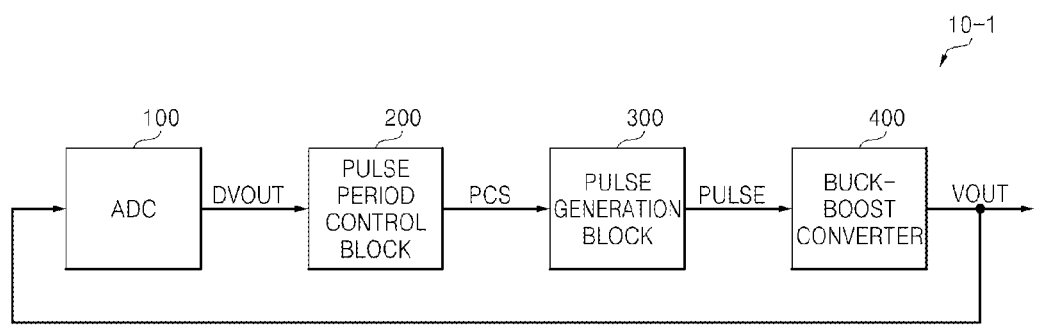
FIG. 1 is a block diagram of a digital buck-boost conversion circuit according to at least some example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 7:
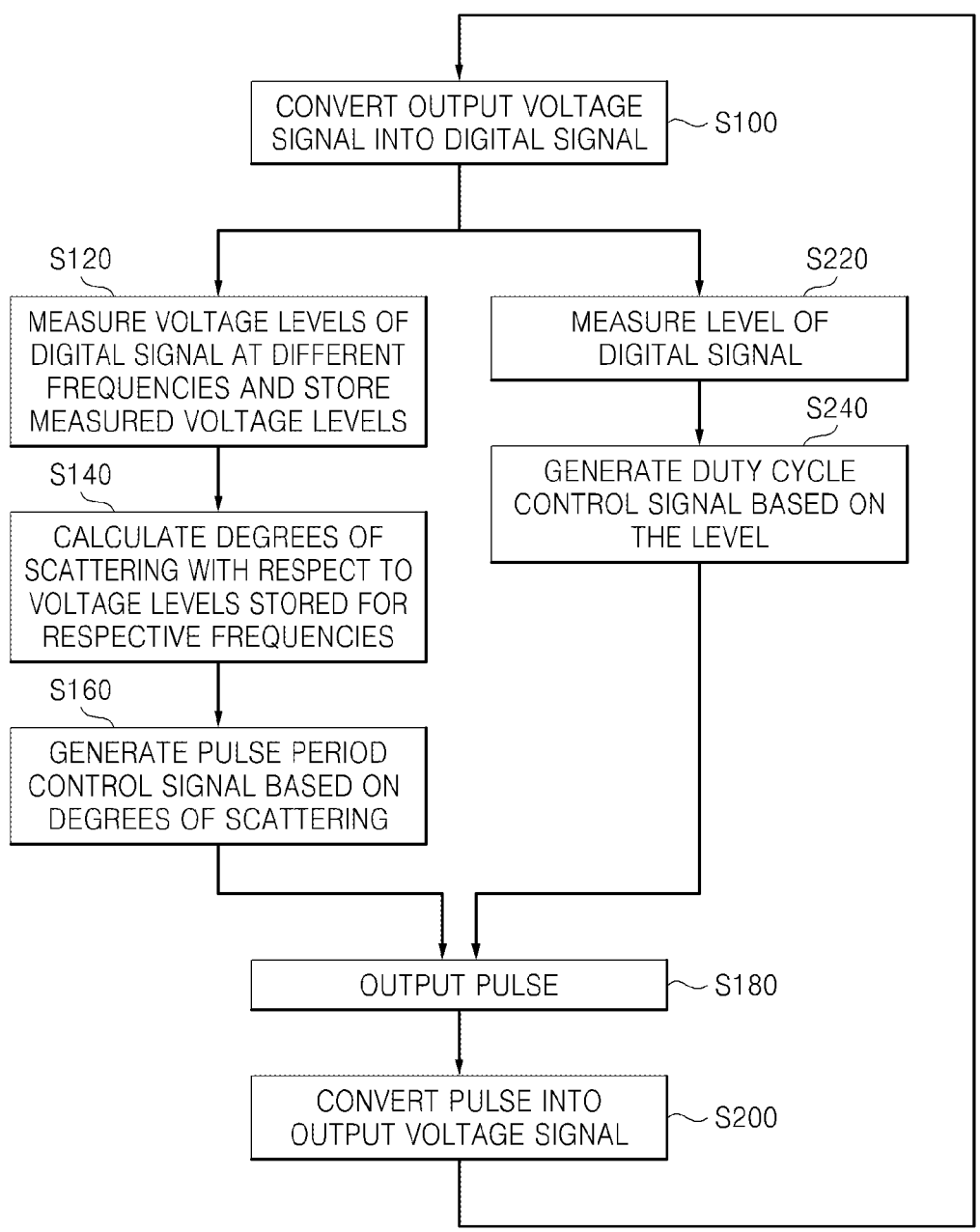
FIG. 7 is a flowchart of a digital buck-boost conversion method according to at least some example embodiments.

FIG. 1 is a block diagram of a digital buck-boost conversion circuit 10-1 according to at least some example embodiments. FIG. 7 is a flowchart of a digital buck-boost conversion method according to at least some example embodiments. The digital buck-boot converter 10-1 illustrated in FIG. 1 will now be discussed below with reference to the operations illustrated in FIG. 7.

Referring to FIG. 1, the digital buck-boost conversion circuit 10-1 includes an analog-to-digital converter (ADC) 100, a pulse period control block 200, a pulse generation block 300, and a buck-boost converter 400.

The ADC 100 converts an output voltage signal VOUT of the buck-boost converter 400 into a digital signal DVOUT in operation S100.

The pulse period control block 200 measures the voltage levels of the digital signal DVOUT at different frequencies in operation S120, calculates the degrees of scattering of the measured voltage levels of the digital signal DVOUT at the respective frequencies in operation S140, and generates and outputs a pulse period control signal PCS for controlling the period of a pulse PULSE based on the calculated degrees of scattering at the different frequencies in operation S160. The degree of scattering may be a variance or a standard deviation.

For instance, when the number of voltage levels of the digital signal DVOUT measured at different frequencies is N (where N is a natural number), the degree of scattering, i.e., variance "v" is calculated using Equation 1:

$$v = \frac{\sum_{i=1}^{N}(l_i - m)^2}{N}. \quad (1)$$

Alternatively, the degree of scattering, i.e., standard deviation "sd" is calculated using Equation 2:

$$sd = \sqrt{\frac{\sum_{i=1}^{N}(l_i - m)^2}{N}}. \quad (2)$$

Referring to Equations 1 and 2, $l_i$ is a value of an i-th ($1 \le i \le N$, i is a natural number) voltage level among the voltage levels of the digital signal DVOUT, which are measured at different frequencies, and "m" is an average value of the voltage levels of the digital signal DVOUT measured at the respective frequencies.

Figure 8:
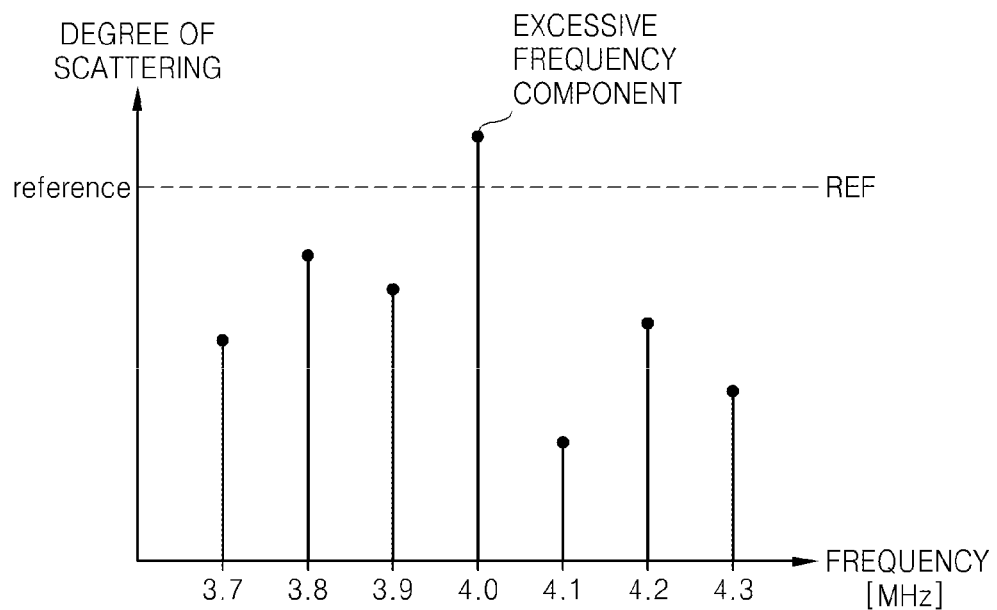
FIG. 8 is a graph for explaining the operation of the pulse period control block illustrated in FIG. 2A, 2B, or 4.

For clarity of the description, a frequency component having the greater degree of scattering than a reference value REF is referred to as an "excessive frequency component", as illustrated in FIG. 8.

Returning to FIG. 1, the pulse generation block 300 outputs the pulse PULSE that does not have the excessive frequency component (hereinafter, referred to as the "pulse without the excessive frequency component") in response to the pulse period control signal PCS output from the pulse period control block 200 in operation S180. As a result, the digital buck-boost conversion circuit 10-1 prevents electromagnetic interference (EMI) and reduces a ripple component in the output voltage signal VOUT. In other words, since the magnitude of the degree of scattering, "v" or "sd", for each frequency is in proportion to the magnitude of a ripple component of the output voltage signal VOUT at the frequency, the digital buck-boost conversion circuit 10-1 reduces the ripple component of the output voltage signal VOUT and prevents EMI using the pulse PULSE without the excessive frequency component.

Figure 2A:
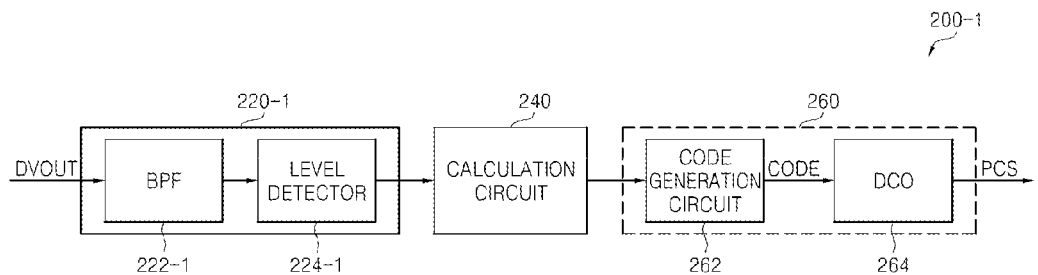
FIG. 2A is a block diagram of an example of a pulse period control block illustrated in FIG. 1.
Figure 2B:
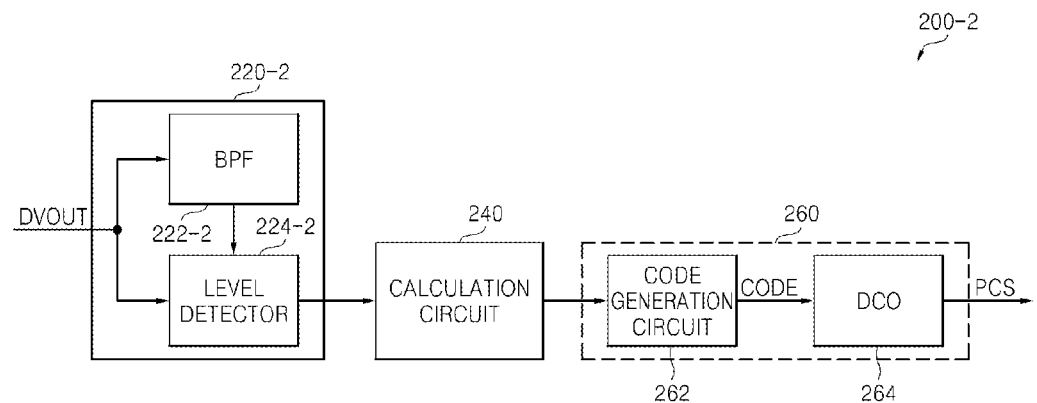
FIG. 2B is a block diagram of another example of the pulse period control block illustrated in FIG. 1.

FIG. 2A is a block diagram of an example 200-1 of the pulse period control block 200-1 illustrated in FIG. 1. FIG. 2B is a block diagram of another example 200-2 of the pulse period control block 200 illustrated in FIG. 1. Referring to FIGS. 1 through 2B and FIG. 7, the pulse period control block 200-1 or 200-2 may include a first sensing circuit 220-1 or 220-2 (both are denoted by 220), a calculation circuit 240, and a first control circuit 260.

The first sensing circuit 220 measures voltage levels of the digital signal DVOUT at different frequencies, respectively, and stores measured voltage levels in a memory (not shown) in operation S120.

In some embodiments, the first sensing circuit 220-1 may include a band pass filter (BPF) 222-1 and a level detector 224-1. The BPF 222-1 decomposes the digital signal DVOUT output from the ADC 100 by frequency domain. The level detector 224-1 measures the voltage level of a decomposed digital signal at each frequency and stores the measured voltage level in the memory to correspond to the frequency.

In other embodiments, the first sensing circuit 220-2 may include a BPF 222-2 and a level detector 224-2. The BPF 222-2 decomposes the digital signal DVOUT output from the ADC 100 by frequency domain. The level detector 224-2 adds a decomposed digital signal at each frequency and the digital signal DVOUT output from the ADC 100, measures the voltage level of a signal resulting from the addition, and stores the voltage level in the memory to correspond to the frequency.

The calculation circuit 240 calculates the degree of scattering of the voltage level stored in the memory with respect to each frequency using Equation 1 and/or Equation 2 in operation S140. The first control circuit 260 generates the pulse period control signal PCS for controlling the period of the pulse PULSE based on the degrees of scattering calculated with respect to the respective frequencies in operation S160. The pulse generation block 300 generates the pulse PULSE without the excessive frequency component in response to the pulse period control signal PCS output from the first control circuit 260 in operation S180.

A procedure in which the digital buck-boost conversion circuit 10-1 outputs the pulse PULSE without the excessive frequency component will be described in detail with reference to FIG. 8 below.

The first control circuit 260 may include a code generation circuit 262 and a digitally controlled oscillator (DCO) 264.

The code generation circuit 262 generates and outputs a clock code CODE for controlling the period of the pulse PULSE based on the degrees of scattering for the respective frequencies. The DCO 264 generates the pulse period control signal PCS having a frequency controlled according to the clock code CODE in operation S160. The pulse generation block 300 outputs the pulse PULSE based on the pulse period control signal PCS output from the pulse period control block 200 in operation S180.

The buck-boost converter 400 converts the pulse PULSE into the output voltage signal VOUT in operation S200. The ADC 100, the pulse period control block 200, and the pulse generation block 300 may be implemented in a single chip or separate chips.

Figure 3:
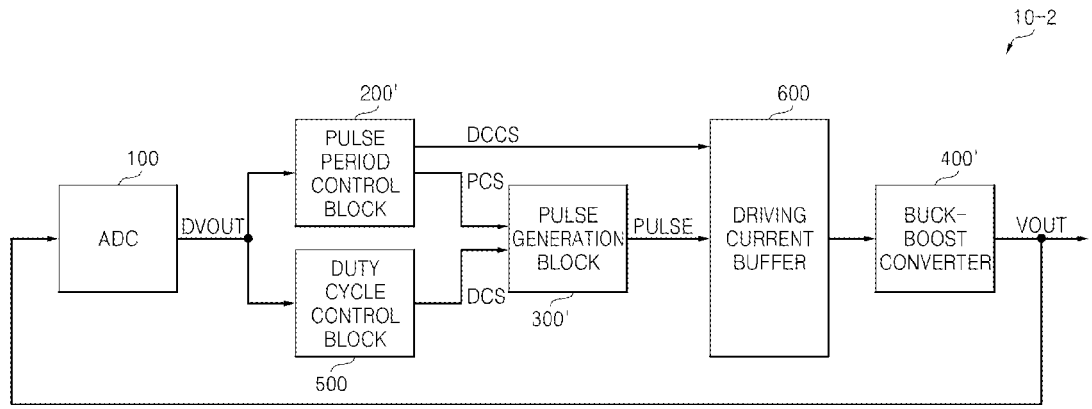
FIG. 3 is a block diagram of a digital buck-boost conversion circuit according to at least some other example embodiments.

FIG. 3 is a block diagram of a digital buck-boost conversion circuit 10-2 according to at least some other example embodiments. Referring to FIGS. 3 and 7, the digital buck-boost conversion circuit 10-2 includes the ADC 100, a pulse period control block 200', a pulse duty cycle control block 500, a pulse generation block 300', the driving current buffer 600, and a buck-boost converter 400', each of which may be implemented in a single chip or separate chips.

The structure and the operation of the ADC 100 illustrated in FIG. 3 are the same as those described above with reference to the ADC 100 illustrated in FIG. 1.

The digital buck-boot converter 10-2 illustrated in FIG. 1 will now be discussed below with reference to the operations illustrated in FIG. 7.

The pulse period control block 200' measures the voltage levels of the digital signal DVOUT at different frequencies in operation S120, calculates the degrees of scattering of the measured voltage levels of the digital signal DVOUT at the respective frequencies in operation S140, and generates and outputs a pulse period control signal PCS for controlling the period of a pulse PULSE and a driving current control signal DCCS for controlling the magnitude of a driving current based on the calculated degrees of scattering at the different frequencies in operation S160.

Figure 4:
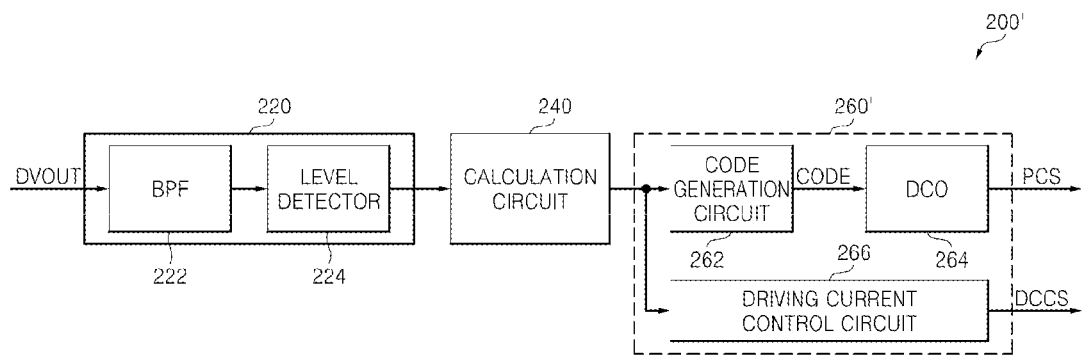
FIG. 4 is a block diagram of a pulse period control block illustrated in FIG. 3.

FIG. 4 is a block diagram of the pulse period control block 200' illustrated in FIG. 3. Referring to FIGS. 3, 4 and 7, the pulse period control block 200' may include the first sensing circuit 220, the calculation circuit 240, and a first control circuit 260'.

The structure and the operation of the first sensing circuit 220 illustrated in FIG. 4 are the same as those described above with reference to the first sensing circuit 220 illustrated in FIG. 2. The structure and the operation of the calculation circuit 240 illustrated in FIG. 4 are the same as those described above with reference to the calculation circuit 240 illustrated in FIG. 2. The first control circuit 260' generates the pulse period control signal PCS for controlling the period of the pulse PULSE and the driving current control signal DCCS for controlling the magnitude of a driving current based on the degrees of scattering for the respective frequencies in operation S160. The first control circuit 260' may include the code generation circuit 262, the DCO 264, and a driving current control circuit 266.

The structure and the operation of the code generation circuit 262 illustrated in FIG. 4 are the same as those described above with reference to the code generation circuit 262 illustrated in FIG. 2. The structure and the operation of the DCO 264 illustrated in FIG. 4 are the same as those described above with reference to the DCO 264 illustrated in FIG. 2.

The driving current control circuit 266 outputs the driving current control signal DCCS based on the degrees of scattering for the respective frequencies. The driving current buffer 600 controls the magnitude of a current output to the buck-boost converter 400' in response to the driving current control signal DCCS.

The pulse duty cycle control block 500 measures the level of the digital signal DVOUT output from the ADC 100 in operation S220 and generates a pulse duty cycle control signal DCS for controlling the duty cycle of the pulse PULSE based on the measured level in operation S240.

Figure 5:
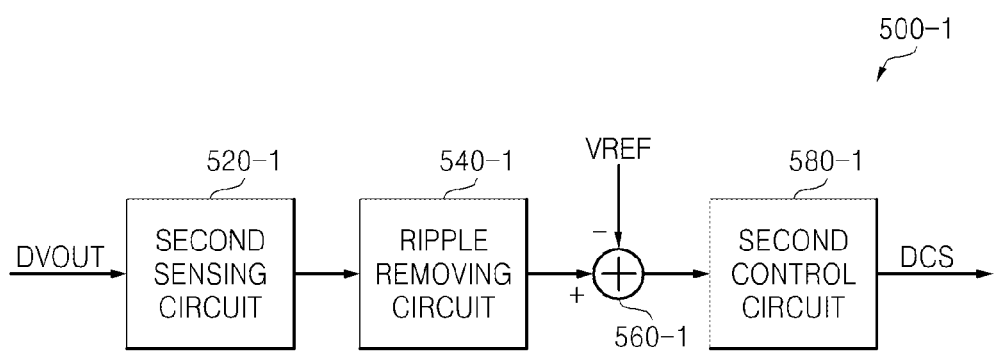
FIG. 5 is a block diagram of an example of a pulse duty cycle control block illustrated in FIG. 3

FIG. 5 is a block diagram of an example 500-1 of the pulse duty cycle control block 500 illustrated in FIG. 3. Referring to FIGS. 1, 3, 5 and 7, the pulse duty cycle control block 500-1 may include a second sensing circuit 520-1, a ripple removing circuit 540-1, a subtraction circuit 560-1, and a second control circuit 580-1.

The second sensing circuit 520-1 senses the level of the digital signal DVOUT output from the ADC 100 and outputs a sensed signal in operation S220. The ripple removing circuit 540-1 removes a ripple component from the signal output from the second sensing circuit 520-1. The ripple removing circuit 540-1 may be a low pass filter.

The subtraction circuit 560-1 outputs a difference between an output voltage of the ripple removing circuit 540-1 and a reference voltage VREF. The second control circuit 580-1 outputs the pulse duty cycle control signal DCS for controlling the duty cycle of the pulse PULSE based on an output value of the subtraction circuit 560-1 in operation S240. The duty cycle may be adjusted according to a pulse duty cycle value included in the pulse duty cycle control signal DCS.

The second control circuit 580-1 may determine a current pulse duty cycle value based on the output value of the subtraction circuit 560-1 and a previous pulse duty cycle value and output the pulse duty cycle control signal DCS including the current pulse duty cycle value in operation S240.

For instance, when X is the output value of the subtraction circuit 560-1, $Y_{n-1}$ is the previous pulse duty cycle value, A is a gain with respect to $Y_{n-1}$, and B is a gain with respect to X, the current pulse duty cycle value of $Y_n$ may be defined as Equation 3:

$$Y_n = A \cdot Y_{n-1} + B \cdot X. \tag{3}$$

Figure 6:
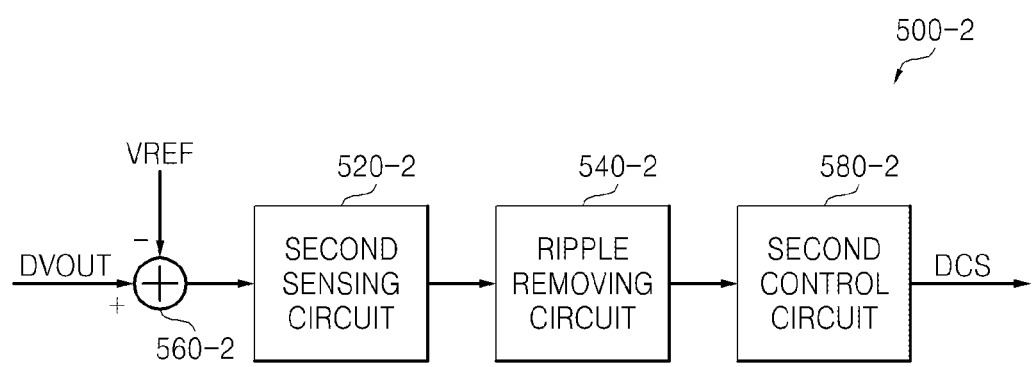
FIG. 6 is a block diagram of another example of the pulse duty cycle control block illustrated in FIG. 3.

FIG. 6 is a block diagram of another example 500-2 of the pulse duty cycle control block 500 illustrated in FIG. 3. Referring to FIGS. 1, 3, 6 and 7, a pulse duty cycle control block 500-2 may include a subtraction circuit 560-2, a second sensing circuit 520-2, a ripple removing circuit 540-2, and a second control circuit 580-2.

The subtraction circuit 560-2 outputs a difference between the digital signal DVOUT output from the ADC 100 and a reference voltage VREF. The second sensing circuit 520-2 senses a level corresponding to the difference in operation S220. The ripple removing circuit 540-2 removes a ripple component from the level. The second control circuit 580-2 outputs the pulse duty cycle control signal DCS including a pulse duty cycle value calculated based on an output signal of the ripple removing circuit 540-2 in operation S240.

The pulse generation block 300' outputs the pulse PULSE whose period and duty cycle have been adjusted according to the pulse period control signal PCS and the pulse duty cycle control signal DCS in operation S180. The driving current buffer 600 converts the pulse PULSE into a driving current based on the driving current control signal DCCS output from the pulse period control block 200' and outputs the driving current to the buck-boost converter 400'.

The structure of the buck-boost converter 400' illustrated in FIG. 3 is the same as the structure described above with reference to the buck-boost converter 400 illustrated in FIG. 1. However, the buck-boost converter 400' converts the driving current output from the driving current buffer 600 into the output voltage signal VOUT while the buck-boost converter 400 converts the pulse PULSE into the output voltage signal VOUT. The ADC 100, the pulse period control block 200', the pulse duty cycle control block 500, the pulse generation block 300', the driving current buffer 600, and the buck-boost converter 400' may be implemented in a single chip or separate chips.

FIG. 8 is a graph for explaining the operation of the pulse period control block 200 or 200' illustrated in FIG. 1 or 3. The graph shows examples of the degrees of scattering of the digital signal DVOUT at different frequencies. Referring to FIG. 8, the digital signal DVOUT has the degree of scattering over the reference value REF at a frequency of 4.0 MHz.

When the degree of scattering for a frequency is high, the ripple of the output voltage signal VOUT increases, and therefore, a pulse without the excessive frequency component is input to the buck-boost converter 400 or 400' in the digital buck-boost conversion circuit 10-1 or 10-2. As a result, the ripple of the output voltage signal VOUT is reduced.

Figure 9:
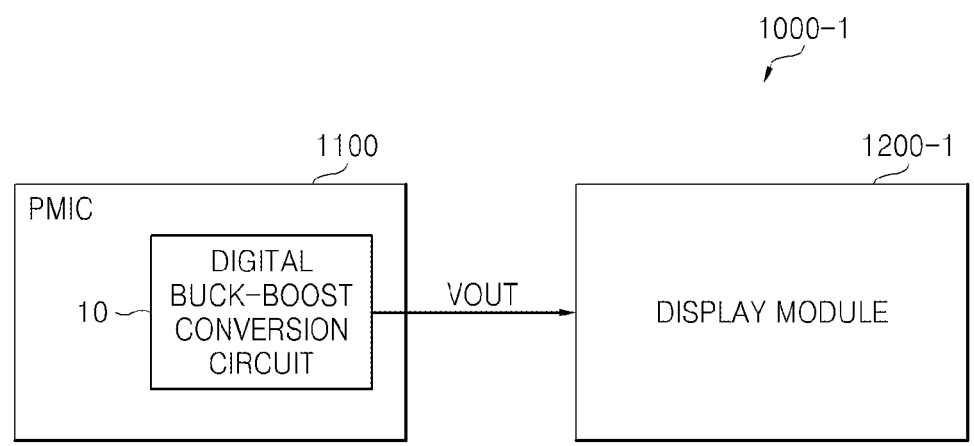
FIG. 9 is a block diagram of an electronic system including the digital buck-boost conversion circuit illustrated in FIG. 1 or 3 according to at least some example embodiments.

FIG. 9 is a block diagram of an electronic system 1000-1 including the digital buck-boost conversion circuit 10 illustrated in FIG. 1 or 3 according to at least some example embodiments. Referring to FIGS. 1, 3 and 9, the electronic system 1000-1 includes a power management device 1100 and a display module 1200-1.

The digital buck-boost conversion circuit 10 included in the power management device 1100 may provide an operating voltage, i.e., the output voltage signal VOUT to the display module 1200-1. The power management device 1100 may be implemented by a power management integrated circuit (PMIC).

Figure 10:
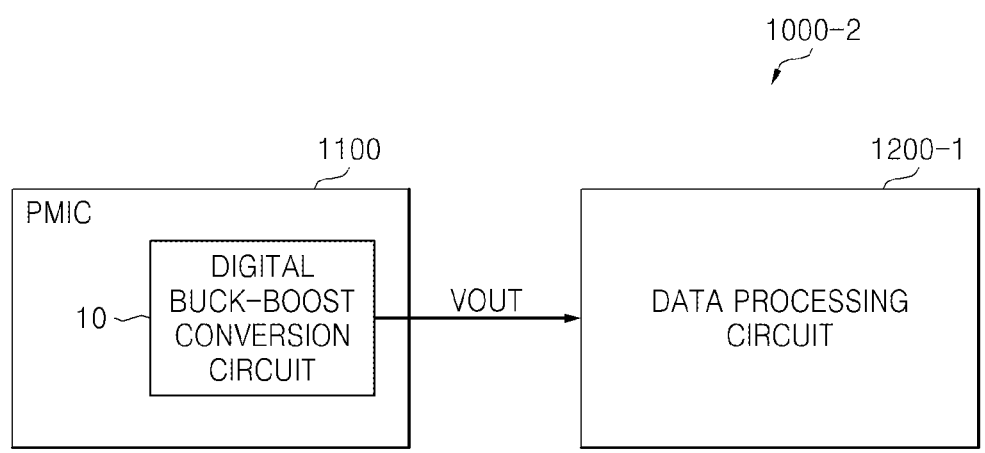
FIG. 10 is a block diagram of an electronic system including the digital buck-boost conversion circuit illustrated in FIG. 1 or 3 according to at least some other example embodiments.

FIG. 10 is a block diagram of an electronic system 1000-2 including the digital buck-boost conversion 10 circuit illustrated in FIG. 1 or 3 according to at least some other example embodiments. Referring to FIGS. 1, 3 and 10, the electronic system 1000-2 includes the power management device 1100 and a data processing circuit 1200-2.

The digital buck-boost conversion circuit 10 included in the power management device 1100 may provide an operating voltage, i.e., the output voltage signal VOUT to the data processing circuit 1200-2. The electronic system 1000-2 may be implemented as a personal computer (PC) or a portable device. The portable device may be a smart phone, a tablet PC, or a laptop computer.

As described above, according to at least some example embodiments, EMI is prevented and a ripple of an output voltage of a digital buck-boost conversion circuit is reduced.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A digital buck-boost conversion circuit comprising:
    an analog-to-digital converter configured to convert an output voltage signal into a digital signal;
    a pulse period control block configured to output a pulse period control signal based on degrees of scattering at different frequencies of the digital signal;
    a pulse generation block configured to output a pulse based on the pulse period control signal; and
    a buck-boost converter configured to convert the pulse into the output voltage signal,
    wherein the pulse period control block includes,
        a first sensing circuit configured to measure voltage levels of the digital signal at each of the different frequencies and store the measured values in a memory;
        a calculation circuit configured to calculate the degrees of scattering at the different frequencies with the measured values stored in the memory; and
        a first control circuit configured to generate the pulse period control signal for controlling a period of the pulse based on the degrees of scattering.

2. The circuit of claim 1, wherein the first sensing circuit includes:
    a band pass filter configured to decompose the digital signal to the each of the different frequencies; and
    a level detector configured to add an output of the band pass filter and the digital signal, generate measurement results by measuring a signal resulting from the addition, and store the measurement results as the measured values in the memory.

3. The circuit of claim 1, wherein the first control circuit includes,
    a code generation circuit configured to output a clock code for the period of the pulse based on the degrees of scattering; and
    a digitally controlled oscillator configured to generate the pulse period control signal based on the clock code.

4. The circuit of claim 1, further comprising a pulse duty cycle control block configured to generate a pulse duty cycle control signal for controlling a duty cycle of the pulse based on a level of the digital signal.

5. The circuit of claim 4, wherein the pulse duty cycle control block includes:
    a second sensing circuit configured to measure the level of the digital signal;
    a ripple removing circuit configured to remove a ripple component from the measured level;
    a subtraction circuit configured to output a difference between an output of the ripple removing circuit and a reference voltage; and
    a second control circuit configured to output the pulse duty cycle control signal having a current pulse duty cycle value, which is determined according to an output of the subtraction circuit and a previous pulse duty cycle value.

6. The circuit of claim 5, wherein the pulse duty cycle value is defined as $Y_n = A \cdot Y_{n-1} + B \cdot X$, where X is the output of the subtraction circuit, $Y_{n-1}$ is the previous pulse duty cycle value, A is a gain with respect to $Y_{n-1}$, and B is a gain with respect to X.

7. The circuit of claim 1, further comprising:
    a driving current buffer configured to output a driving current to the buck-boost converter based on the pulse, wherein the pulse period control block outputs a driving current control signal for controlling a magnitude of the driving current.

8. A mobile device comprising the digital buck-boost conversion circuit of claim 1.

9. A digital buck-boost conversion method, the method comprising:
    converting an output voltage signal into a digital signal;
    generating a pulse period control signal based on degrees of scattering at different frequencies of the digital signal;
    generating a pulse whose period has been controlled based on the pulse period control signal; and
    converting the pulse into the output voltage signal,
    wherein the generating the pulse period control signal includes, measuring voltage levels of the digital signal at each of the different frequencies and storing the measured voltage levels in a memory;
        calculating the degrees of scattering at the each of the different frequencies using the measured voltage levels stored in the memory; and
        generating the pulse period control signal based on the degrees of scattering.

10. The method of claim 9, wherein the generating the pulse period control signal including:
    generating a clock code for controlling the period of the pulse based on the degrees of scattering; and
    generating the pulse period control signal based on the clock code.

11. The method of claim 9, further comprising:
generating a pulse duty cycle control signal for controlling a duty cycle of the pulse based on a level of the digital signal.

12. The method of claim 11, wherein the generating the pulse duty cycle control signal including:
measuring the level of the digital signal;
removing a ripple component from the measured level; and
generating the pulse duty cycle control signal having a current pulse duty cycle value, which is determined according to a difference between a result of removing the ripple component and a reference voltage and a previous pulse duty cycle value.

13. The method of claim 12, wherein the pulse duty cycle value is defined as $Y_n = A \cdot Y_{n-1} + B \cdot X$, where X is the difference between the result of removing the ripple component and the reference voltage, $Y_{n-1}$ is the previous pulse duty cycle value, A is a gain with respect to $Y_{n-1}$, and B is a gain with respect to X.

14. A conversion circuit comprising:
an analog-to-digital converter configured to convert an output voltage signal into a digital signal;
a buck-boost converter configured to generate the output voltage based on a pulse period control signal; and
a pulse period control block configured to determine one or more excessive frequencies, and generate the pulse period control signal such that the output voltage signal generated by the buck-boost converter does not include a frequency component corresponding to one of the one or more excessive frequencies,
wherein the pulse period control block is configured to identify degrees of scattering at different frequencies of the digital signal, and determine the one or more excessive frequencies from among the different frequencies of the digital signal based on the degrees of scattering.

15. The conversion circuit of claim 14, wherein the one or more excessive frequencies are frequencies determined by the pulse period control block to be associated with degrees of scattering above a reference degree.

16. The conversion circuit of claim 14, wherein for each of a plurality of different frequencies of the digital signal, the pulse period control block is configured to measure a plurality of voltage levels of the digital signal at the frequency, and to determine a scattering value associated with the frequency based on at least one of a variance and a standard deviation of the measured plurality of voltage levels, and
wherein the one or more excessive frequencies are frequencies having scattering values above a reference value, from among the plurality of different frequencies.

17. The conversion circuit of claim 14, further comprising:
a pulse generation block configured to output a pulse based on the pulse period control signal, the buck-boost converter being configured to convert the pulse into the output voltage signal.

* * * * *